United States Patent
Stählin et al.

(10) Patent No.: US 10,827,356 B2
(45) Date of Patent: Nov. 3, 2020

(54) ELECTRONIC DEVICE, VEHICLE SYSTEM AND METHOD FOR SAFEGUARDING WIRELESS DATA COMMUNICATION

(71) Applicants: Continental Teves AG & Co. oHG, Frankfurt (DE); Continental Automotive GmbH, Hannover (DE)

(72) Inventors: Ulrich Stählin, Rochester, MI (US); Klaus Rink, Rodenbach (DE); Marc Menzel, Weimar (DE); Steffen Linkenbach, Eschborn (DE)

(73) Assignees: Continental Teves AG & Co. oHG (DE); Continental Automotive GmbH (DE)

( * ) Notice: Subject to any disclaimer, the term of this patent is extended or adjusted under 35 U.S.C. 154(b) by 156 days.

(21) Appl. No.: 16/116,150

(22) Filed: Aug. 29, 2018

(65) Prior Publication Data
US 2020/0077263 A1 Mar. 5, 2020

(51) Int. Cl.
| | |
|---|---|
| *H04L 29/06* | (2006.01) |
| *H04W 12/08* | (2009.01) |
| *H04W 4/02* | (2018.01) |
| *H04W 4/40* | (2018.01) |

(52) U.S. Cl.
CPC ........... *H04W 12/08* (2013.01); *H04L 63/107* (2013.01); *H04W 4/023* (2013.01); *H04W 4/026* (2013.01); *H04W 4/40* (2018.02)

(58) Field of Classification Search
CPC ....... H04W 12/08; H04W 4/40; H04W 4/023; H04W 4/026; H04L 63/107
See application file for complete search history.

(56) References Cited

U.S. PATENT DOCUMENTS

| | | | | |
|---|---|---|---|---|
| 8,862,872 | B2 * | 10/2014 | Vanderveen | H04L 9/3247 713/156 |
| 9,838,365 | B2 * | 12/2017 | Park | H04W 12/0401 |
| 9,986,596 | B2 | 5/2018 | Stählin et al. | |
| 10,075,420 | B2 * | 9/2018 | Zhu | H04L 9/3271 |
| 10,180,682 | B2 * | 1/2019 | Rasmussen | H04L 67/12 |
| 10,599,854 | B2 * | 3/2020 | Kodama | G06F 21/6218 |
| 10,608,818 | B2 * | 3/2020 | Watanabe | H04L 63/00 |

(Continued)

FOREIGN PATENT DOCUMENTS

| | | |
|---|---|---|
| DE | 102017103187 A1 | 8/2017 |
| WO | 2016177661 A1 | 11/2016 |
| WO | 2018148622 A1 | 8/2018 |

OTHER PUBLICATIONS

German Examination Report for German Application No. 10 2019 212 274.4, dated Jul. 7, 2020, 8 pages.

*Primary Examiner* — Joseph P Hirl
*Assistant Examiner* — Stephen T Gundry
(74) *Attorney, Agent, or Firm* — RatnerPrestia

(57) ABSTRACT

An electronic device, having a communication module for wireless data communication with a further electronic device, which is distinguished in that the electronic device is configured to use at least one quantitative value in order to characterize a spatial reference of the electronic device to the further electronic device in order to secure the wireless data communication, with the further electronic device. Furthermore, an aspect of the invention relates to a vehicle system having at least one electronic device according to an aspect of the invention as well as a corresponding method.

19 Claims, 2 Drawing Sheets

(56) References Cited

U.S. PATENT DOCUMENTS

| | | | |
|---|---|---|---|
| 10,706,809 B2* | 7/2020 | Shin | G06F 3/147 |
| 2014/0059662 A1* | 2/2014 | Zhu | H04L 63/06 |
| | | | 726/6 |
| 2015/0358351 A1* | 12/2015 | Otsuka | H04L 12/66 |
| | | | 726/23 |
| 2016/0248740 A1* | 8/2016 | Peirce | H04L 63/0457 |
| 2016/0261990 A1* | 9/2016 | Zimmermann | H04W 64/006 |
| 2016/0344747 A1* | 11/2016 | Link, II | G06F 21/35 |
| 2017/0011572 A1* | 1/2017 | Link, II | G06F 21/34 |
| 2017/0105120 A1* | 4/2017 | Kang | H04L 63/0876 |
| 2017/0106834 A1* | 4/2017 | Williams | H04W 4/023 |
| 2017/0302626 A1* | 10/2017 | Yan | H04L 67/12 |
| 2017/0303084 A1* | 10/2017 | Bruckner | H04W 4/023 |
| 2017/0308689 A1 | 10/2017 | Boesen | |
| 2018/0035255 A1* | 2/2018 | Kordybach | H04W 4/023 |
| 2018/0069846 A1* | 3/2018 | Park | H04L 63/0876 |
| 2018/0132298 A1* | 5/2018 | Birnam | H04W 76/14 |
| 2018/0206280 A1* | 7/2018 | Kasparick | H04B 17/309 |
| 2018/0232971 A1 | 8/2018 | Schieke et al. | |
| 2018/0239349 A1* | 8/2018 | Rasmussen | H04W 12/0609 |
| 2018/0302768 A1* | 10/2018 | Uchiyama | G08G 1/166 |
| 2018/0376280 A1* | 12/2018 | N Sje | H04W 4/029 |
| 2019/0036946 A1* | 1/2019 | Ruvio | G06F 21/55 |
| 2019/0061686 A1 | 2/2019 | Neuhoff et al. | |
| 2019/0090093 A1* | 3/2019 | Odejerte, Jr. | H04W 4/026 |
| 2019/0116619 A1* | 4/2019 | Hauck | H04L 9/0662 |
| 2019/0248331 A1* | 8/2019 | Salah | B60R 25/24 |
| 2019/0265868 A1* | 8/2019 | Penilla | B60N 2/0228 |
| 2019/0320334 A1* | 10/2019 | Djuknic | H04W 4/02 |
| 2019/0332371 A1* | 10/2019 | Kobayashi | G06F 8/65 |
| 2020/0015038 A1* | 1/2020 | Burugupalli | G01S 13/765 |
| 2020/0023812 A1* | 1/2020 | Hassani | G07C 5/008 |
| 2020/0027091 A1* | 1/2020 | Hassani | G06Q 20/322 |
| 2020/0031315 A1* | 1/2020 | Breer | H04W 4/023 |
| 2020/0169842 A1* | 5/2020 | Yamaguchi | H04W 12/06 |

* cited by examiner

ELECTRONIC DEVICE, VEHICLE SYSTEM AND METHOD FOR SAFEGUARDING WIRELESS DATA COMMUNICATION

FIELD OF THE INVENTION

The invention relates to an electronic device, a vehicle system and a method.

BACKGROUND OF THE INVENTION

High-frequency cables in a vehicle are comparatively expensive. The objective is therefore to replace these if at all possible by other transmission routes in the vehicle. One solution is to integrate processing electronics into the antenna, which is also known by the designation "intelligent antenna", hereinafter referred to as IAM. Intelligent antennae usually comprise transmitting and receiving technology, e.g. one or more antennae and, if applicable, amplifiers, and functional electronic assemblies for further processing the signals to be transmitted and received. The processing in particular comprises a modulation/demodulation and coding/decoding of data as well as the operation of lower layers of the communication protocols. The transmission of analog HF signals by means of high-frequency cables between the antenna and a control unit, which provides or uses the data, can consequently take place by means of digitized data which are supplied via a bus system to other control units. This concept is, however, disadvantageous in that a wired connection is still necessary.

In order to overcome these disadvantages, WO 2016177661 A1, incorporated by reference herein, discloses a vehicle system comprising a vehicle-to-X communication unit (V2X unit) for operating vehicle-to-X communication having a communication module for wireless data transmission and a control unit for executing a user application with a communication module for wireless data transmission, wherein the communication module of the control unit can be coupled to the communication module of the V2X unit. Here, the V2X unit and the control unit can be activated in a data transmission mode, in order to couple the communication modules for wireless data transmission of the V2X unit and of the control unit with one another for data exchange. If, however, the transmission takes place wirelessly, there is a risk of manipulating the signals, since the connection between the IAM and the control unit can only be safeguarded purely cryptographically at data level.

SUMMARY OF THE INVENTION

An aspect of the invention is an electronic device, a vehicle system and a method respectively, which improve the protection against unlawful access.

An aspect of the invention relates to an electronic device, having a communication module for wireless data communication with a further electronic device, wherein the electronic device is configured to use at least one quantitative value in order to characterize a spatial reference of the electronic device to the further electronic device in order to protect the wireless data communication with the further electronic device.

An aspect of the invention is based on the idea of safeguarding a wireless connection between at least two electronic devices, in particular of a vehicle, using at least one value which characterizes a spatial reference of the communicating devices to one another. The quantitative value is dependent on the spatial reference of the respective communicating subscribers, as a result of which an unlawful intervention in the communication link as such and, consequently, the devices is made considerably more difficult or respectively can be more simply identified, in particular if an anomalous spatial reference is recognized. Consequently, it can be ensured that the data communication takes place with the communication subscriber actually desired.

In accordance with one embodiment, the device is configured to determine the at least one quantitative value by means of radio-based location measurement. The term 'radio-based location measurement' within the framework of an aspect of the present invention denotes any form of wired locating by means of suitable electromagnetic waves. Here, the suitability of the respective electromagnetic waves is determined in particular in accordance with the specific occurrences.

According to a further development, the device is configured to perform the determination of the at least one quantitative value by radio-based location measurement by means of radio technology provided for wireless data communication with the further electronic device. As a result, the radio technology provided for wireless data communication can advantageously be used in parallel for the radio location and, consequently, for safeguarding the data combination.

According to a further development, the quantitative value describes at least one of the following spatial items of reference information of the electronic device with respect to the further electronic device:
  a distance from the further electronic device,
  a direction to the further electronic device, and/or
  a position of the further electronic device.

Here, the distance or respectively the direction expediently relates to the electronic device. According to one example, a relative position with respect to the electronic device and/or an absolute position, for example with respect to a vehicle coordinates system, can be a position of the further electronic device, wherein in the case of an absolute position a comparison is expediently made with an absolute position of the electronic device. In accordance with a further development, the device is configured to establish, using the quantitative value, where the further electronic device is located with respect to a vehicle comprising the electronic device, in particular whether the further electronic device is located within the same vehicle.

According to a further development, the communication device is configured to establish the aforementioned quantitative values by means of radio-based location measurement as follows:
  Measurement of the distance from the further electronic device,
  Measurement of the direction to the further electronic device, and/or
  Measurement of the position of the further electronic device.

Various methods are known to the person skilled in the art, which can be applied in the present case to measure the indicated variables, in particular as a function of the radio technology deployed.

In accordance with one embodiment, the device is configured to deploy at least one of the following radio technologies for the radio-based location measurement:
  WLAN, in particular according to a standard of the IEEE 802.11 family,
  ultra-wide band (UWB), and/or
  mobile radio.

The provided radio technologies are, in any case, expediently deployed in particular to realize further vehicle functions. According to a further development, the radio locating can consequently take place by means of at least one of the radio technologies indicated. In addition or alternatively, the data communication takes place with precisely this radio technology and/or with at least one of the further radio technologies indicated.

In accordance with one embodiment, the device is configured to use the determination of the quantitative value by means of a vehicle access system configured for the localization of a vehicle key, which is expediently already provided in a vehicle. According to a further development, it can in addition be provided that the device is configured to use the functional module originally provided for a localization of a vehicle key, in order to signal the fact that a data communication between the electronic devices has not been brought about. One advantage which results therefrom is that it is comparatively difficult to interrupt the low frequencies which are usually used for the localization of a vehicle key, compared with the high data rates which are usually used for data communication. Consequently, it can be assumed in the case of a localization signal being received that data communication can take place. If, however, no signal is received, interference can be assumed. According to one expedient further development, it is possible in this case to change to another frequency range for the data communication.

In accordance with a further development, the electronic device is configured to check the plausibility of the quantitative value on the basis of a predefined expected value of the quantitative value. If the result of the plausibility check is that the quantitative value is deemed to not be plausible, the device is equipped according to a further development to not perform or respectively to terminate the data communication. Here, it can be defined in an application-specific way whether the quantitative value is deemed to be plausible, for example by taking account of tolerance limits of the radio-based location measurement in connection with the quantitative value to be determined.

In accordance with one embodiment, the electronic device comprises a data memory, wherein the predefined expected value of the quantitative value is stored in the data memory, wherein it can in particular be provided that the quantitative value is saved in the data memory during a manufacturing process of the electronic device.

According to a further development, the device can be configured to use position information and/or reference information of the electronic device with respect to the further electronic device provided by the further electronic device by means of wireless and/or wired data communication for a plausibility check of the quantitative value.

According to a further aspect of the invention, the device is set up to implement a method in accordance with an aspect of the invention.

In a further development of the indicated electronic device, the indicated device has a memory and a processor. Here, the indicated method is lodged in the memory in the form of a computer program and the processor is provided to execute the method if the computer program is loaded from the memory into the processor.

According to a further aspect of the invention, a computer program comprises program code means in order to implement all the steps of one of the indicated methods according to an aspect of the invention, if the computer program is run on a computer or one of the indicated devices.

According to a further aspect of the invention, a computer program product contains a program code which is saved on a computer-readable data carrier and which, if it is run on a data processing facility, implements one of the indicated methods.

An aspect of the invention further relates to a vehicle system comprising at least one electronic device in accordance with at least one embodiment of an aspect of the invention for executing a vehicle function and an antenna device for wireless data communication with a further road user and/or an infrastructure facility, wherein the antenna device has a communication module for wireless data communication with the electronic device. In particular, vehicles, cyclists or respectively pedestrians are deemed to be road users in this sense.

In accordance with one embodiment of the vehicle system, the first electronic device is configured as a localization unit of a vehicle access system for localizing a vehicle key.

In accordance with one embodiment of the vehicle system, the electronic device is configured as an electronic control unit for realizing vehicle-to-X communication with the antenna device, wherein the electronic control unit is configured to process vehicle-to-X messages which are received and which are to be transmitted.

In accordance with one embodiment of the vehicle system, the antenna device is likewise configured as an electronic device according to at least one embodiment of an aspect of the invention. As a result, the securing of the communication link can be advantageously checked by both electronic devices. In accordance with this embodiment, the electronic control unit is configured to process vehicle-to-X messages which are received and which are to be transmitted.

Accordingly, the antenna device, in particular an intelligent antenna, can be configured as an electronic device within the meaning of an aspect of the invention, or as a transponder during the realization of the communication procedure in conjunction with an electronic device within the meaning of an aspect of the invention or respectively of the vehicle system within the meaning of an aspect of the invention.

In particular, an intelligent antenna within the meaning of an aspect of the invention has transmitting and receiving technology, e.g. one or more antennae and, if applicable, amplifiers, and/or functional electronic assemblies for further processing signals to be transmitted and received, wherein the processing in particular comprises modulation/demodulation and coding/decoding of data as well as the operation of lower layers of the communication protocols.

Moreover, an aspect of the invention relates, to a method for safeguarding wireless data communication between a first electronic device and a second electronic device of a vehicle, having the steps of:
  determining at least one quantitative value in order to characterize a spatial reference of the first electronic device to the second electronic device,
  safeguarding wireless data communication between the first electronic device and the second electronic device, using the at least one quantitative value.

In accordance with one further development of the method, the at least one quantitative value is determined by means of radio-based location measurement.

In accordance with one embodiment of the method, the determination of the at least one quantitative value takes place by means of radio technology provided for wireless data communication between the first electronic device and the second electronic device.

In accordance with one embodiment of the method, the quantitative value describes at least one of the following items of spatial reference information of the first electronic device with respect to the second electronic device:

a distance from the second electronic device,
a direction to the second electronic device, and/or
a position of the second electronic device.

In accordance with one embodiment of the method, a plausibility check of the quantitative value is carried out on the basis of a predefined expected value of the quantitative value.

In accordance with one further development of the method, no wireless data communication takes place and/or wireless data communication is terminated if the quantitative value is deemed to not be plausible as a result of the plausibility check.

BRIEF DESCRIPTION OF THE DRAWINGS

Some particularly advantageous configurations of aspects of the invention are indicated in the subordinate claims. Further preferred embodiments are also set out by the following description of embodiment examples on the basis of schematically represented figures, wherein:

DETAILED DESCRIPTION OF THE PREFERRED EMBODIMENTS

Figure 1:
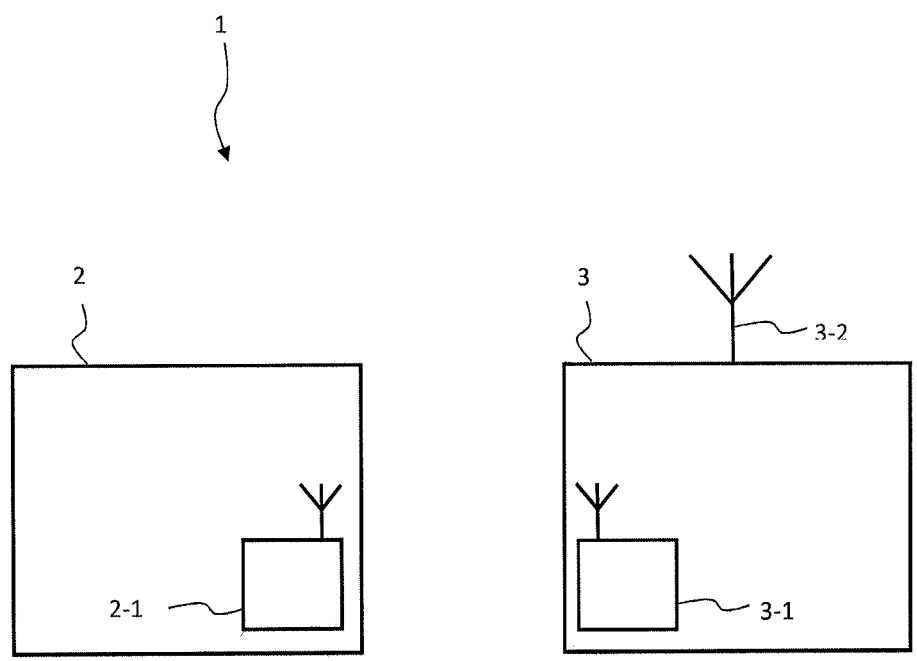
FIG. 1 shows one embodiment example of a vehicle system having one embodiment of the electronic device according to an aspect of the invention.

FIG. 1 shows a vehicle system 1 having an electronic device configured as an electronic control unit 2 for realizing a vehicle-to-X communication and an antenna device 3 for wireless data communication by means of an antenna 3-2 with further road users and/or infrastructure facilities. The electronic control unit has a communication module 2-1 for wireless data communication with the antenna device 3. For this purpose, the antenna device 3 also has a communication module 3-1 for wireless data communication with the electronic control unit.

In this case, the wireless data connection between the electronic control unit 2 and the antenna device 3 is safeguarded by means of a quantitative value which characterizes a spatial reference of the communicating devices with respect to one another.

Figure 2:
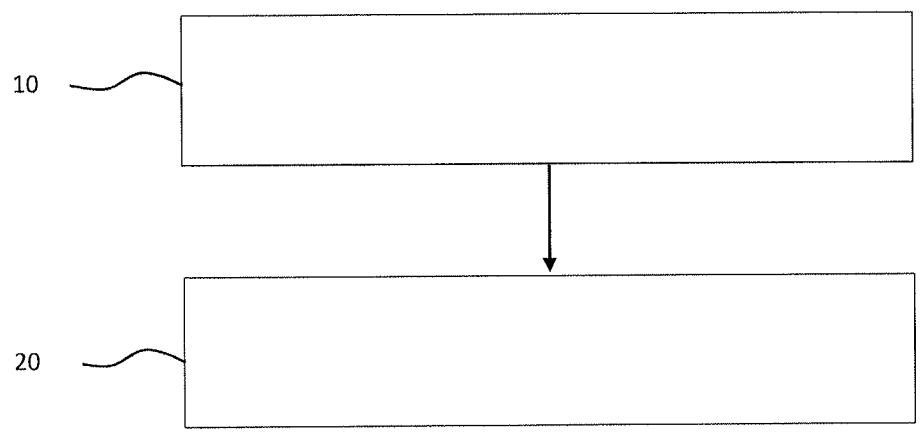
FIG. 2 shows one embodiment of the method according to an aspect of the invention.

One exemplary procedure of operation is explained on the basis of FIG. 2. In a first step 10, the electronic control device 2 determines the at least one quantitative value in order to characterize the spatial reference of the electronic control device 2 to the antenna device 3. In a second step 20, the wireless data communication between the electronic control device 2 and the antenna device 3 is safeguarded, using the at least one quantitative value. Here, the quantitative value is preferably determined by means of radio-based location measurement. The quantitative value constitutes, for example, a distance of the electronic control device 2 from the antenna device 3, a direction to the antenna device 3 and/or a position of the antenna device.

The communication link is safeguarded in accordance with one embodiment in such a way that a plausibility check of the established quantitative value takes place on the basis of a predefined expected value of the quantitative value. In this case, the predefined expected value of the largest value can in particular be stored in a data memory of the electronic control device. For example, the storage can take place during the course of a manufacturing process of a vehicle which comprises the electronic control device 2 and the antenna device 3, if the spatial reference thereof is fixed with respect to one another. In this respect, this can already take place prior to installing the components in the vehicle.

If it is recognized within the framework of the plausibility check that the established quantitative value is plausible, it can possibly be assumed, taking into consideration further prerequisites which have to be met, that a data communication with the desired communication subscriber is taking place. The data communication is accordingly not performed or respectively is terminated, if the quantitative value is deemed to not be plausible as a result of the plausibility check.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p, IEEE 1609.4 or 4G or 5G. Vehicle-to-X communication can also be referred to as C2X communication. The sub-areas can be referred to as C2C (Car-to-Car) or C2I (Car-to-Infrastructure). Aspects of the invention expressly do not, however, exclude vehicle-to-X communication with the intermediary of, for example, a mobile network.

The invention claimed is:

1. A vehicle system, including:
an electronic control unit (ECU) installed in a vehicle; and
an antenna module installed in the vehicle at predetermined spatial reference relative to the ECU, the antenna module being in wireless data communication with the ECU,
wherein the antenna module is configured to facilitate wireless data communication between the ECU and an external electronic device external to the vehicle,
wherein the ECU or the antenna module is configured to determine and use at least one quantitative value indicating a measured spatial reference of the ECU relative to the antenna module, and
wherein based on a comparison between the at least one quantitative value and a predetermined quantitative value indicating the predetermined spatial reference, the ECU or the antenna module performs or terminates the wireless data communication:
a) between the ECU and the antenna module, or
b) between the ECU and the external electronic device.

2. The vehicle system according to claim 1, configured to determine the at least one quantitative value by a radio-based location measurement.

3. The vehicle system according to claim 2, configured to perform the determination of the at least one quantitative value by radio-based location measurement by radio technology provided for wireless data communication between the ECU and the antenna module or between the ECU and the external electronic device.

4. The vehicle system according to claim 1, configured to perform the determination of the at least one quantitative value by radio-based location measurement by radio technology provided for wireless data communication between the ECU and the antenna module or between the ECU and the external electronic device.

5. The vehicle system according to claim 1, wherein the quantitative value describes at least one of the following items of spatial reference information:
- a distance from the ECU to the antenna module,
- a direction to the ECU from the antenna module or from the antenna module to the ECU, or
- a position of the ECU or of the antenna module.

6. The vehicle system according to claim 1, configured to carry out a plausibility check of the quantitative value on the basis of a predefined expected value of the quantitative value.

7. The vehicle system according to claim 6, comprising a data memory, wherein the predefined expected value of the quantitative value is stored in the data memory.

8. The vehicle system according to claim 7, configured to use position information and/or reference information of the ECU with respect to the antenna module provided by the ECU or the antenna module by wireless and/or wired data communication for a plausibility check of the quantitative value.

9. The vehicle system according to claim 7, configured to not perform and/or to terminate wireless data communication if the quantitative value is deemed to not be plausible as a result of the plausibility check.

10. The vehicle system according to claim 6, configured to not perform and/or to terminate wireless data communication if the quantitative value is deemed to not be plausible as a result of the plausibility check.

11. The vehicle system according to claim 10, configured to use position information and/or reference information of the ECU with respect to the antenna module provided by the ECU or the antenna module by wireless and/or wired data communication for a plausibility check of the quantitative value.

12. The vehicle system according to claim 1, wherein
the ECU is configured to execute a vehicle function, and
the antenna module includes a communication module for facilitating the wireless data communication with the ECU or the external electronic device.

13. The vehicle system according to claim 1, wherein the antenna module is configured as the ECU.

14. A method for safeguarding wireless data communication between a first electronic device installed in a vehicle and a second electronic device installed in the vehicle at predetermined spatial reference relative to the first electronic device, comprising:
determining, by the first electronic device or the second electronic device, at least one quantitative value indicating a measured spatial reference of the first electronic device relative to the second electronic device, and
performing or terminating, by the first electronic device or the second electronic device, based on a comparison between the at least one quantitative value and a predetermined quantitative value indicating the predetermined spatial reference, wireless data communication:
a) between the first electronic device and the second electronic device, or
b) between the first electronic device and a further electronic device external to the vehicle.

15. The method according to claim 14, wherein the at least one quantitative value is determined by radio-based location measurement.

16. The method according to claim 15, wherein the determination of the at least one quantitative value takes place by radio technology provided for wireless data communication between the first electronic device and the second electronic device.

17. The method according to claim 14, wherein the quantitative value describes at least one of the following items of spatial reference information of the first electronic device with respect to the second electronic device:
a distance from the second electronic device,
a direction to the second electronic device, and/or
a position of the second electronic device.

18. The method according to claim 14, wherein a plausibility check of the quantitative value is carried out on the basis of a predefined expected value of the quantitative value.

19. The method according to claim 18, wherein no wireless data communication takes place and/or wireless data communication is terminated, if the quantitative value is deemed to not be plausible as a result of the plausibility check.

* * * * *